(12) United States Patent
Yu et al.

(10) Patent No.: US 9,720,983 B1
(45) Date of Patent: Aug. 1, 2017

(54) EXTRACTING MOBILE APPLICATION KEYWORDS

(71) Applicant: Google Inc., Mountain View, CA (US)

(72) Inventors: Zhou Yu, Sunnyvale, CA (US); Yudong Gao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 406 days.

(21) Appl. No.: 14/324,997

(22) Filed: Jul. 7, 2014

(51) Int. Cl.
*G06F 7/00* (2006.01)
*G06F 17/30* (2006.01)

(52) U.S. Cl.
CPC .. *G06F 17/30536* (2013.01); *G06F 17/30542* (2013.01)

(58) Field of Classification Search
CPC ............... G06F 17/30536; G06F 17/30542
USPC ................................................. 707/749, 737
See application file for complete search history.

(56) References Cited

U.S. PATENT DOCUMENTS

| | | |
|---|---|---|
| 7,801,899 B1 | 9/2010 | Spitkovsky |
| 8,700,599 B2 | 4/2014 | Udupa et al. |
| 2009/0198579 A1 | 8/2009 | Lewis et al. |
| 2010/0299360 A1* | 11/2010 | Yi .......................... G06Q 30/02 707/776 |
| 2013/0054801 A1* | 2/2013 | Belchee ................ G06F 21/105 709/225 |
| 2013/0085860 A1 | 4/2013 | Summers et al. |
| 2013/0290369 A1* | 10/2013 | Sayers .................... H04L 67/22 707/769 |
| 2015/0254714 A1* | 9/2015 | Zhuang .............. G06Q 30/0256 705/14.54 |
| 2016/0012220 A1* | 1/2016 | Padidar ............. G06F 17/30598 726/22 |

OTHER PUBLICATIONS

Nath et al., "SmartAds: Bringing Contectual Ads to Mobile Apps," MobiSys'13, Jun. 25-28, 2013, 13 pages.

* cited by examiner

*Primary Examiner* — Van Oberly
(74) *Attorney, Agent, or Firm* — Foley & Lardner LLP; John D. Lanza

(57) ABSTRACT

Methods, systems, and apparatus, including computer programs encoded on a computer storage medium, for content presentation. In one aspect, a method includes obtaining information associated with a mobile application of interest; determining a plurality of similar applications to the application of interest; determining keywords from the similar applications; and extracting new keywords for the application of interest using a model trained using statistical information for keywords of the plurality of similar applications that overlap with keywords of the application of interest.

26 Claims, 6 Drawing Sheets

EXTRACTING MOBILE APPLICATION KEYWORDS

BACKGROUND

This specification relates to content presentation.

Advertisers provide sponsored content items in different forms in order to attract consumers. A sponsored content item such as an advertisement ("ad") is a piece of information designed to be used in whole or part by a user, for example, a particular consumer. Sponsored content items can be provided in electronic form. For example, online ads can be provided as banner ads on a web page, as ads presented with search results, or as ads presented in a mobile application.

SUMMARY

In general, one innovative aspect of the subject matter described in this specification can be embodied in methods that include the actions of obtaining information associated with a mobile application of interest; determining multiple similar applications to the application of interest; determining keywords from the similar applications; and extracting new keywords for the application of interest using a model trained using statistical information for keywords of the multiple similar applications that overlap with keywords of the application of interest. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The determined keywords include keywords identified as having statistical information relating to the performance of the keyword for a particular application of the multiple similar applications. Statistical information relating to the performance of a particular keyword is extrapolated for a first application based on the known statistical information of one or more other applications and a similarity measure between the first application and the respective application of the one or more other applications. Training the model includes calculating coefficients for a least regression using the statistical information for each application and the application of interest for each overlapping keyword. The least regression model is weighted based on the respective similarities between applications of the multiple similar applications. Extracting new keywords includes calculating projected statistical information for the application of interest for one or more non overlapping keywords from the multiple similar applications. The method further includes determining application keywords to use for identifying content items for presentation on the application according to a ranking of the statistical information for the application keywords and the new extracted keywords.

In general, one innovative aspect of the subject matter described in this specification can be embodied in methods that include the actions of obtaining information associated with an application of interest; determining that the application of interest is not from a first mobile application platform; determining that a counterpart application to the application of interest exists on a second mobile application platform; and expanding keywords of the application of interest based on statistical information associated with the counterpart application and multiple similar applications to the counterpart application. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining that a counterpart application to the application of interest exists includes using one or more of an application index and a developer index generated for one or more mobile application platforms. The method includes crawling pages of an application store; extracting application metadata from the crawled information; and generating the application index and the developer index using the metadata. Determining that a counterpart application to the application of interest exists includes: determining whether a counterpart application of the same name as the application of interest is found on the second mobile application platform; if the counterpart application of the same name is not found, determining whether the second mobile platform includes a same developer as the developer of the application of interest; and if the developer is found; determining whether the application is found among applications of the developer in the second mobile application platform. Determining whether the second mobile platform includes a same developer includes determining whether applications on the second mobile application platform reference a same web domain. Determining whether the application is found among applications of the developer includes comparing application information of the application of interest with application information of the developer on the second mobile application platform.

Particular embodiments of the subject matter described in this specification can be implemented so as to realize one or more of the following advantages. Additional keywords for a given application can be identified using similar applications to provide additional context for providing sponsored content items on the application, which can result in more relevant sponsored content items being presented to users. Additionally, keywords can be identified for applications from different mobile application platforms based on identifying corresponding applications on a known mobile application platform.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Advertisers seek to have sponsored content items (e.g., ads) presented to users likely to be interested in the sponsored content items. For example, sponsored content items can be selected for users based on an application that the user is using on a mobile device.

In some implementations, sponsored content items can be presented within applications executing on the mobile device. For example, a mobile device can include a number of distinct applications, each providing different application content (e.g., a news application, a game application). Sponsored content items can be presented along with the application content while the application is executing.

One technique for providing sponsored content items to an application relies on keywords associated with an application. For example, keywords of an application can be compared with keywords associated with particular sponsored content items, as described below. The present specification describes techniques for expanding keywords for an application using similar applications.

While reference will be made below to advertising systems and methods, other forms of content including other forms of sponsored content can be managed, presented, and selected in accordance with the description below.

Figure 1:
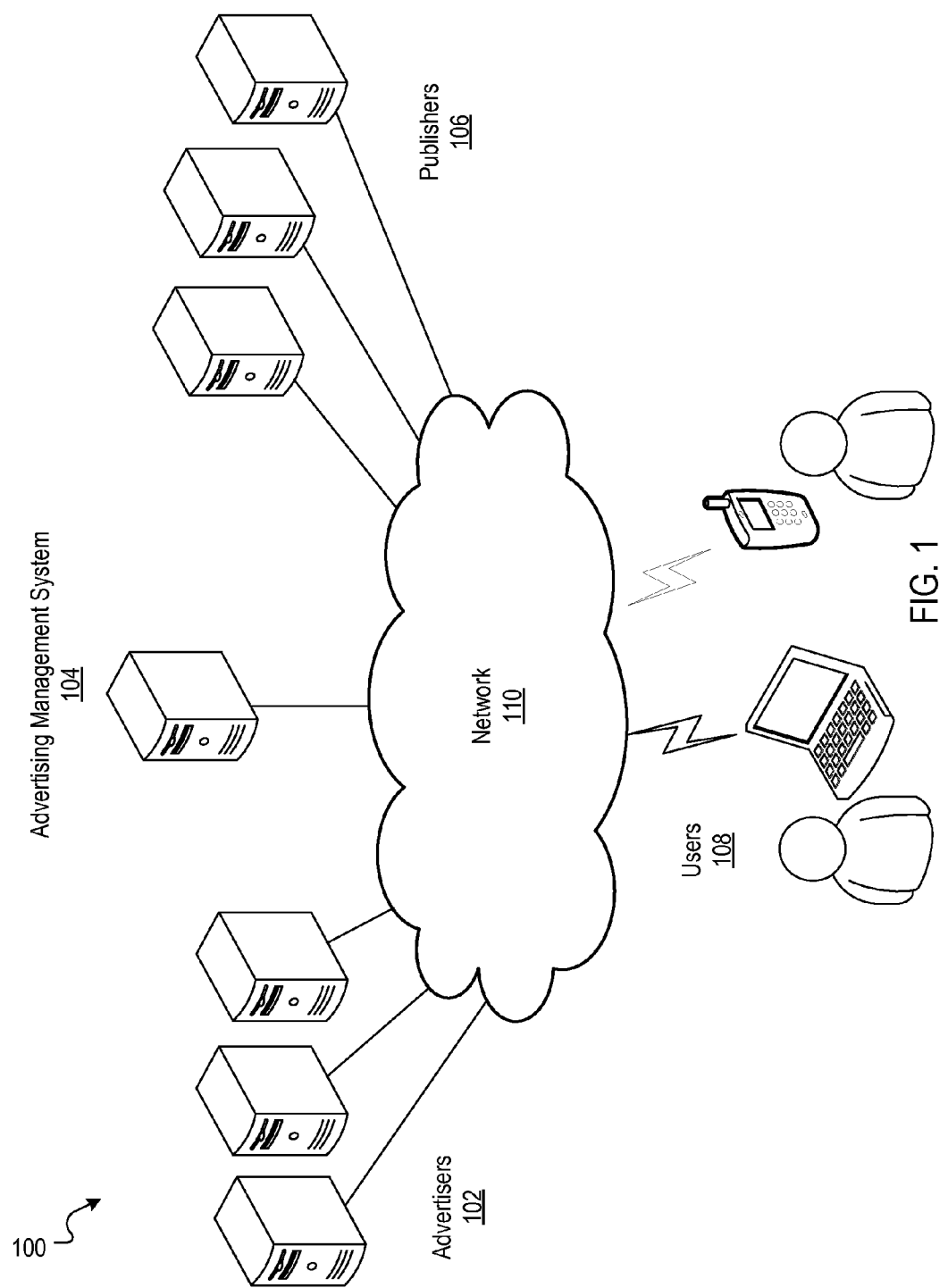
FIG. 1 is a block diagram of an example content presentation system.

FIG. 1 is a block diagram of an example content presentation system 100. In some implementations, one or more advertisers 102 can directly, or indirectly, enter, maintain, and store ad information in an advertising management system 104. Though reference is made to advertising, other forms of content, including other forms of sponsored content, can be delivered by the system 104. The ads can be in the form of graphical ads, such as banner ads, text only ads, image ads, barcode ads (e.g., ads including one or more barcodes, for example, to use in redeeming the ad), audio ads, video ads, ads combining one or more of any of such components, and so on. The ads can also include embedded information, such as links, meta-information, and/or machine executable instructions.

One or more publishers 106 can submit requests for ads to the system 104. The advertising management system 104 responds by sending ads to the requesting publisher 106 for placement on, or association with, one or more of the publisher's content items (e.g., web properties). Example web properties can include web pages, television and radio advertising slots, or print media space. Web properties can appear in applications for mobile devices.

Other entities, such as users 108 and 110 and advertisers 102, can provide usage information to the system 104, for example, whether or not a conversion (e.g., a purchase or other interaction) or a click-through related to an ad (e.g., a user has selected an ad) has occurred. This usage information can include measured or observed user behavior related to ads that have been served. In some implementations, the advertising management system 104 performs financial transactions, for example, crediting the publishers 106 and charging the advertisers 102 based on the usage information.

A network 112, such as a local area network (LAN), wide area network (WAN), the Internet, one or more telephony networks or a combination thereof, connects the advertisers 102, the system 104, the publishers 106, and the users 108 and 110.

One example publisher 106 is a general content server that receives requests for content (e.g., articles, discussion threads, music, video, graphics, search results, web page listings, information feeds, and so on), and retrieves the requested content in response to the request. The content server can submit a request for ads to an advertisement server in the advertising management system 104. The ad request can include a number of ads desired. The ad request can also include content request information. The content request information can include the content itself (e.g., page, video broadcast, radio show, or other type of content), a category corresponding to the content or the content request (e.g., arts, business, computers, arts-movies, arts-music, and so on), part or all of the content request, content age, content type (e.g., text, graphics, video, audio, mixed media, and so on), geo-location information, and so on.

In some implementations, the content server (or a client browser or the like) can combine the requested content with one or more of the ads provided by the advertising management system 104. The combined content and ads can be served (e.g., sent/rendered) to the users 108 that requested the content for presentation in a viewer (e.g., an application on a mobile device). The content server can transmit information about the ads back to the advertisement server, including information describing how, when and/or where the ads are to be rendered (e.g., in hypertext markup language (HTML) or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number (e.g., ten) of search results.

The search service can submit a request for ads to the advertising management system 104. The request can include a number of ads desired. This number can depend on the search results, the amount of screen or page space occupied by the search results, the size and shape of the ads, and so on. In some implementations, the number of desired ads will be from one to ten, or from three to five. The request for ads can also include the query (as entered or parsed), information based on the query (such as geo-location information, whether the query came from an affiliate and an identifier of such an affiliate), and/or information associated with, or based on, the search results. The information can include, for example, identifiers related to the search results (e.g., document identifiers of "docIDs"), scores related to the search results (e.g., information retrieval ("IR") scores), snippets of text extracted from identified documents (e.g., web pages), full text of identified documents, feature vectors of identified documents, and so on. In some implementations, IR scores can be computed from, for example, dot products of feature vectors corresponding to a query and a document, page rank scores, and/or combinations of IR scores and page rank scores, and so on.

In some implementations, the advertising management system 104 includes an auction process to select ads from the advertisers 102. For example, the advertisers 102 can be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the system 104. This combined information can then be forwarded to the users 108 and 110 that requested the content. The search results can be maintained as distinct from the ads, so as not to confuse the user between paid ads and presumably neutral search results.

In some implementations, one or more publishers 106 can submit requests for ads to the advertising management system 104. The system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the users 108 and 110, e.g., by the execution of a script when the publisher's web page is loading on a client device.

Another example publisher 106 is a mobile application developer. A mobile application is an application specifically designed for operation on a mobile device (e.g., a smartphone). The mobile application can also include ads positioned within the content of the mobile application. The ads can be received from the system 104 for placement in the mobile application when accessed by a user (e.g., when a particular page of a mobile application is loaded on the mobile device).

Figure 2:
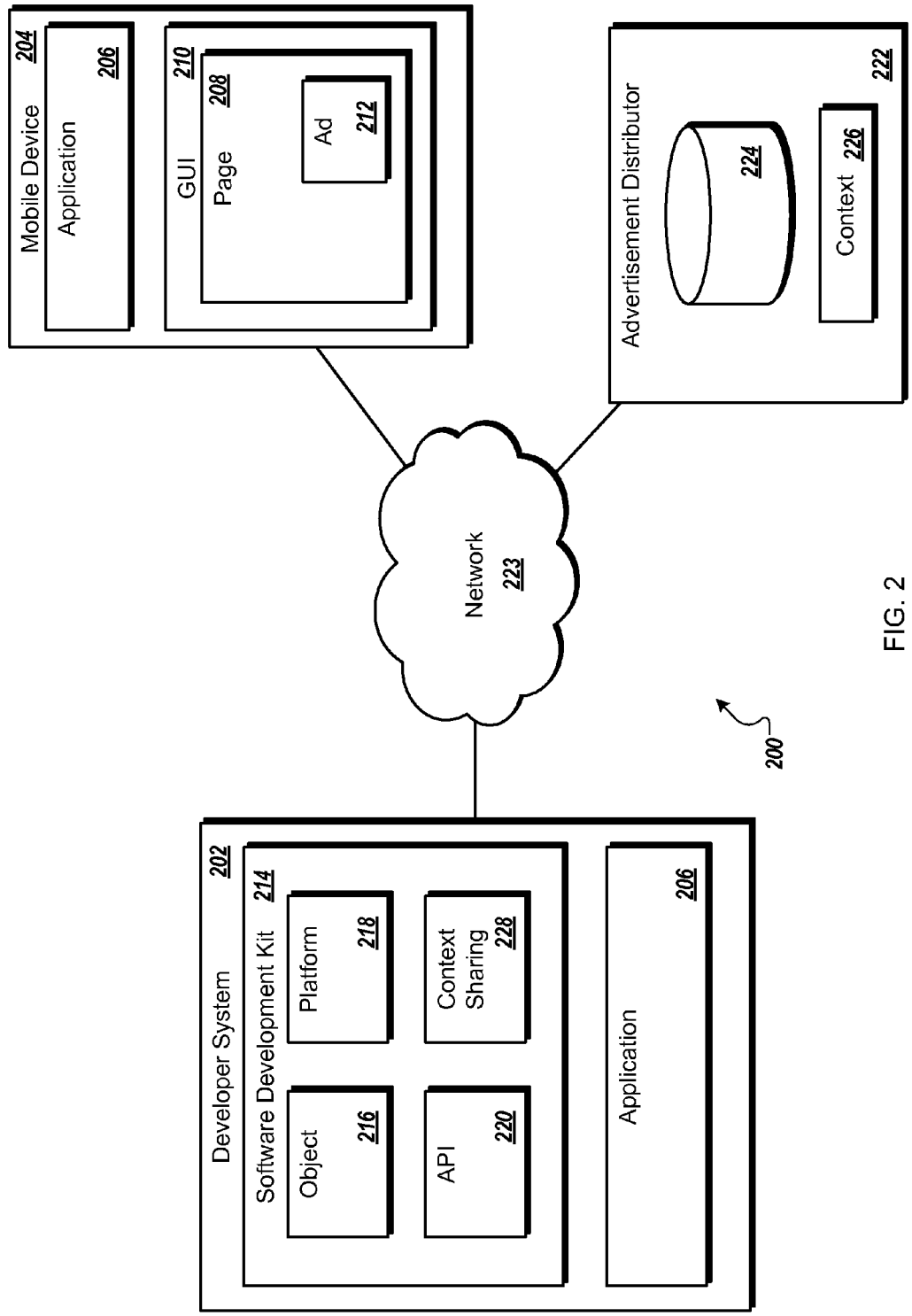
FIG. 2 is a block diagram of an example system including a mobile device application.

FIG. 2 is a block diagram of an example of a system 200 including a mobile device application. In this example, a developer system 202 can be used by a developer to create program content such as applications for one or more mobile devices 204. The mobile devices 204 can include, for example, a cellular telephone, a personal digital assistant or any other type of mobile device. Particularly, the developer can create an application 206 such as by generating program code and compiling it into an executable program compatible with the mobile device 204. The application 206 can be formulated so that it presents one or more pages 208 in a graphical user interface 210 of the mobile device 204, such as on a display screen. Individual systems and/or components can be implemented using hardware, firmware, software, or combinations thereof, and can be divided or joined into different number of units. Examples below will illustrate how the developer can configure the application 206 so that content 212, for example, as an advertisement from a third party, can be presented on the page(s) 208 when the application 206 is being executed.

A software development kit 214 can be provided to the developer for creating the application 206 and/or other programs. The software development kit 214 can provide editors for code and/or pseudocode, one or more compiling functions, emulating functions for previewing display content, and a debugging function, to name just a few examples. In some implementations, the software development kit 214 can also be configured to provide the developer a convenient way of adding third-party content such as advertisements to a program created for mobile devices. For example, the software development kit 214 can provide the developer with the necessary code and/or other application content so that advertisements are requested and displayed to a user when received.

The software development kit 214 can provide one or more objects 216. In some implementations, the developer can incorporate the object 216 in the code when creating the application. For example, the software development kit 214 can provide the object(s) 216 on a screen, such as where the developer generates the overall application content, in a way that the developer can select the object and include the corresponding material in the application 206 as it is being created.

The software development kit 214 can be configured so that the application(s) 206 can be created according to a particular platform 218. In some implementations, the platform 218 can be directed to mobile devices, such as to the type of the mobile device 204 which can include a cell phone, a handheld device, or a personal digital assistant, to name just a few examples. In some implementations, the object 216 is included before the application code is compiled into an executable program. For example, the object can be incorporated as an integrated part of the application by inserting code before compilation.

The object 216 can perform one or more functions. In some implementations, the object can cause third party content such as the advertisement(s) 212, to appear on the mobile device 204. For example, the object 216 can be responsible for requesting relevant ad(s), displaying the ad(s) in the right manner to the user.

In some implementations, the object 216 is a scripting object that is configured to be added to a user interface of the application 206 and handle fetching and rendering of, and interaction with, content such as advertisements. For example, the developer can implement a view object that extends a view class associated with the application 206.

This object can represent a base class to create an advertisement view. A constructor can set the client parameter in a content ads request that can include a URL for a frontend involved in content requests. In some examples, such an extension can use void setAdLayoutType(int placement) to specify top and/or bottom placement of the view that requests the content. Other ways of displaying the content (e.g., an ad) can be used, such as a gallery that places thumbnails of image content in a gallery view.

One or more functions can be used with the object. Such function(s) can customize the look and feel of the content when it is displayed. In some implementations, such function(s) can set one or more CGI parameters in a content request.

An application program interface (API) 220 can be used with the object 216. In some implementations, the API is a API that a developer can call when incorporating content such as advertisements into the application 206. For example, the object 216 can include a code snippet that uses a particular API 220 configured so that the developer can insert the code into the application 206. As noted earlier, such a code snippet can construct a request for content such as an ad based on a developer's customization, fetch the content and write it to the user interface of the application 206.

The ad 212 can include a number of different types of content. In some implementations, ad types including, but not limited to, text ads, image ads (including static and animated images) and video ads can be used. For example, the ad can provide for user navigation (e.g., a link) to other content associated with the advertiser. Other types of content are possible (e.g., non-advertising content).

An advertisement distributor system 222 can be used to forward any type of content such as the ad 212 to the mobile device 204 and/or the developer system 202. In some implementations, the advertisement distributor system 222 is configured to receive request(s) for content from the mobile device 204, fetch one or more matching ads or other content from a repository 224, and forward the matching content to the mobile device 204. For example, the matching of the ad 212 can be performed using a context component 226 that can provide one or more context parameters associated with the application 206 configured for identifying matching content/advertisements.

The developer system 202, the mobile device 204 and/or the advertisement distributor system 222 can be connected using any kind of network 223, such as the Internet. For example, the developer system 202 and the advertisement distributor system 222 can communicate using the TCP/IP suite of protocols and the mobile device 204 can communicate using any suitable kind of wireless protocol.

Relevant context of the application 206 and/or the mobile device 204 can be shared in different ways. In some implementations, the developer can share context including metadata about the application 206 with the advertisement distributor system 222. A context sharing component 228 in the software development kit 214 can allow the developer to enter one or more keywords that the developer decides are relevant for retrieving and presenting content such as advertisements. For example, the developer who creates the application can submit the keyword(s) using the context sharing component 228 for receipt by the context component 226 for storage. In some implementations, analysis can be performed to determine how well the submitted metadata correlates with the application 206 and if necessary, modifications in the used context parameter(s) can be made.

In some implementations, context can be shared by the developer submitting the application 206 to the advertisement distributor system 222. The context sharing component 228 can be used in submitting some or all of the application 206 for use in evaluating context. This can be done as part of a setup process so that the advertisement distributor system 222 can examine the application to determine the context of the content/ads to be forwarded. Examples of aspects that can be taken into account include, but are not limited to, textual content of a previous screen or page on the mobile device 204, a content of the entire application 206, and/or content of other view objects such as sibling objects.

Analysis of the application 206 can include analyzing the code (such as by static analysis), determining a general context of the application 206, or determining the specific context of one or more of the particular pages 208. This can require the context component 226 to determine which of the pages 208 is currently active in the mobile device 204. For example, this can be done using a version of the application 206 provided by the developer. If or when the application 206 is later updated, a revised version can be forwarded to the advertisement distributor system 222, for example using the context sharing component 228, so that the context can be updated if necessary.

As another example, context can be determined by providing that the developer can specify one or more hooks in the code of the application 206. In some implementations, the software development kit 214 and/or the platform 218 can provide such feature(s). For example, a global variable can be made to change state at one or more stages of the application 206. Such a variable can be read by the object 216, such as by a snippet of code.

Context parameter(s) for use in finding matching content such as ads can be stored in any of a variety of forms. For example, the context component 226 can store one or more keywords, categories, labels, topics, context information and/or any other kind of parameter for use by the advertisement distributor system 222.

The following is an example of how an implementation as described above can be used. A developer can create the application 206 intended for the mobile device 204 using the software development kit 214. Particularly, the application 206 can be created according to the platform 218 and can include the object 216. The developer can forward the application 206 to the mobile device for use, for example when the device 204 is initially sold or as a later update, such as by a download process. The developer can also provide context relating to the application 206, such as by submitting one or more keywords and/or providing a version of the application 206, using the context sharing component 228. One or more context parameters can be registered at the advertisement distributor system 222.

When a user operates the mobile device 204, content such as one or more ads 212 can be presented on the page(s) 208. The content can be selected for presentation by the advertisement distributor system 222 based on the context parameter(s). In some implementations, the user can interact with the ad(s) 212 in one or more ways, such as by clicking on the ad 212, performing a developer-specified combination of key presses (e.g., tapping a single key twice, or tapping two keys in rapid succession), or tapping on the ad on a touch-screen device.

Content such as ads can be retrieved in any of a variety of ways. In some implementations, content can be retrieved essentially according to an on-demand approach. For example, ads or other content can be requested from the advertisement distributor system 222 and forwarded from there for display. Such implementations can have the advantage that the ad that is displayed to the user can be very current to the particular state of the application 206 and/or the mobile device 204.

In some implementations, a pre-fetch approach can be used. For example, a developer can configure the application 206 such that multiple content portions such as ads are requested from the advertisement distributor system 222. The ads can be stored at a suitable location, such as on the mobile device 204 and/or on another computer device such as a server that communicates with the mobile device 204. At some point, such as by determination performed by the application 206, the ad(s) can be displayed on the mobile device 204, for example when it returns to an online mode after having been offline. The developer can provide for reporting of which contents/ads have been displayed, for example by incorporating a feature from the software development kit 214 into the application 206. In some implementations, client-side frequency capping can be used, for example by having a class associated with content/ad presentation count previously served content/ads and ensures that the same content/ad is presented according to a rule (e.g., not more than a predetermined number of times per session). Other approaches for fetching content can be used.

In some implementations, a new content portion such as the ad 212 can be presented when an activity that uses the class associated with content/ad presentation is displayed for the first time. As another example, the new ad/content can be presented when the activity has been removed from an activity stack in the mobile device 204. In yet another example, a content/ad can be presented if a previous ad/content has been displayed for a predetermined amount of time if the mobile device 204 continues to be active (e.g., if a backlight of the display on the device remains on). In some implementations, the developer can facilitate user-initiated refresh of content/ads using a class responsible for generating gallery views, for example to provide a carousel-style browsing of ads.

The software development kit 214 has been mentioned in examples above. In some implementations, the kit 214 can be extended or enhanced using a wizard in an interface directed toward publishers. For example, the advertisement distributor system 222 can provide a user interface where publishers can establish an account to become affiliated with an advertising program, and this interface can feature the wizard as a way for the developer(s) to customize the look and feel of content/ads to be displayed in connection with the application 206. In some implementations, this can be implemented as a self-service sign-up process for developers, for example to allow the opportunity to enhance their application offering with ads and/or other content. As another example, and assuming that users' privacy rights are taken into account, such an interface can provide reporting statistics on ad clicks, impressions, queries, revenue and/or other aspects to the advertisement distributor system 222.

Figure 3:
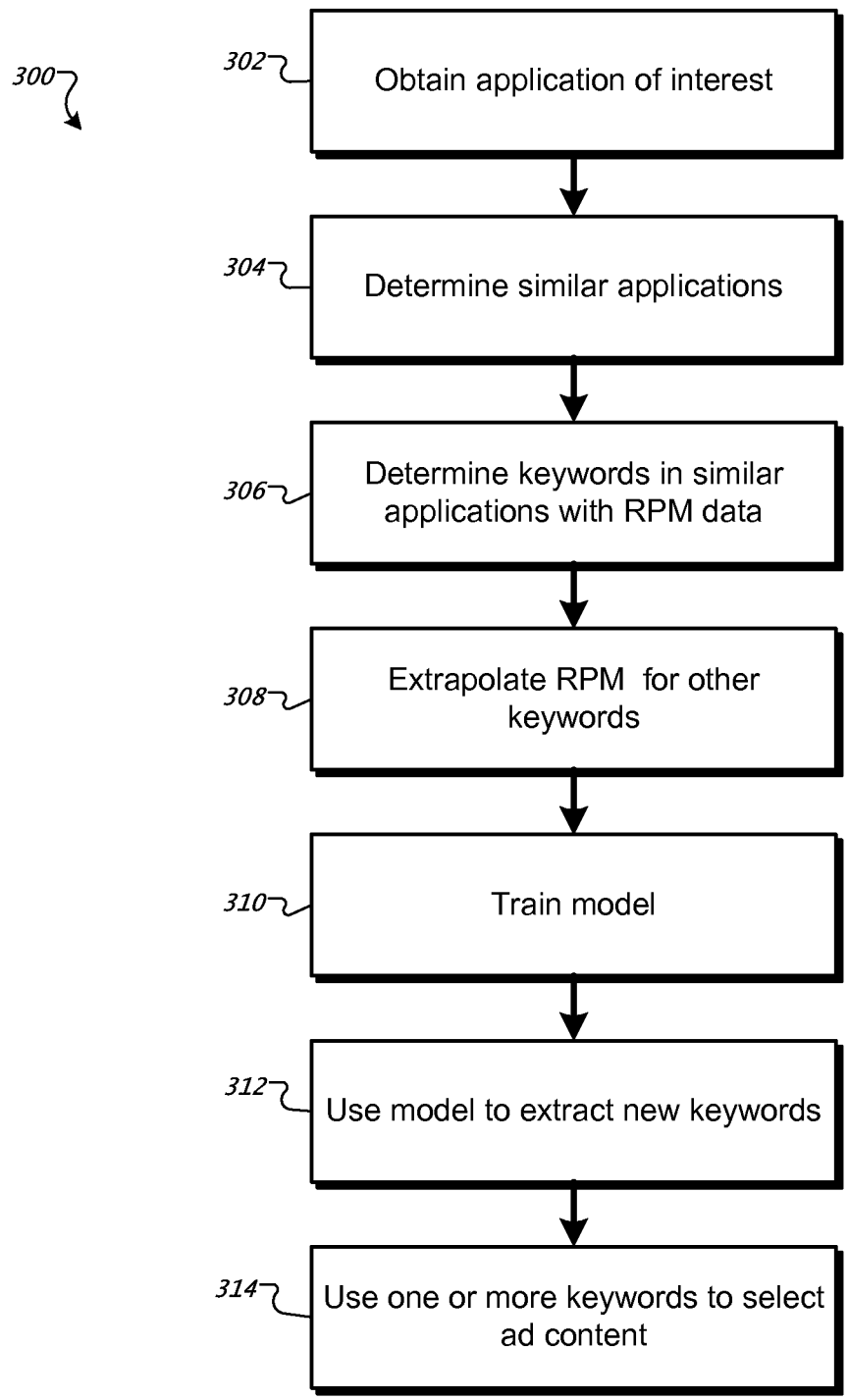
FIG. 3 is flow diagram of an example process for extracting keywords.

FIG. 3 is flow diagram of an example process 300 for extracting keywords for an application. For convenience, the process 300 will be described with respect to a system that performs the process 300.

The system obtains information associated with an application of interest (302). In some implementations, the application information is obtained from a particular mobile application store. For example, the store contents can be crawled to obtain public application information. In some other implementations, applications are submitted by application developers or from advertisers seeking to provide advertising content within the application.

The system performs data preparation including determining similar applications (304), determining keywords from the similar applications that have statistical information (306), and extrapolating the statistical information for keywords of applications that are missing statistical information (308).

Determining similar applications (304) includes determining a specified number of applications, e.g., 3, 5, etc., that are similar to the obtained application of interest, referred to as App0. In some implementations, an existing data structure such as a knowledge graph is used to identify similar applications. The knowledge graph can refer to a database that stores information about entities, e.g., a database of structured data, e.g., a graph database that includes nodes that represent entities and identifies the type of each entity represented by a node. The database of structured data can also include links between nodes that represent relationships between entities, with the type of the link between two nodes identifying the type of relationship that exists between the entities represented by the nodes. Similarly, the database can include links between nodes representing entities and data representing attribute values of the entity, with the type of the link identifying the attribute.

In some other implementations, other suitable measures of similarity can be used with respect to a collection of applications. For example, a similarity measure can be based on keywords in the application name and associated descriptions or identified application categories. In some other implementations, application categories can be identified based on the organizational hierarchy of the application store. Another example similarity measure can be based on the description text associated with the respective applications. For example, how similar text paragraphs or sentences of the description are between applications. Various known techniques for comparing text and generating a similarity measure can be used.

Each application has a similarity score associated with the application of interest based on the particular similarity measure used. The applications having similarity scores indicating that they are most similar to the application of interest are selected as the similar applications.

For each of the similar applications, keywords are identified that have sufficient statistical information (306). The statistical information can include a measure of revenue per thousand impressions "RPM." The RPM represents the estimated earnings for every 1000 advertisement impressions associated with the keyword. The RPM data can be obtained from advertising data. For example, an advertising system (e.g., advertising management system 104 of FIG. 1) can collect, for each keyword, the revenue and impression statistics for served ads.

The keywords having sufficient statistical information that occur in at least a specified number of the similar applications, e.g., 3, are selected. These keywords can be further filtered to determine relevancy. In some implementations, a voting system is used that requires at least 50% of the similar applications to vote for those keywords, for example, where each application gets one vote, e.g., based on the keyword with the highest RPM, and the top keywords from the voting are selected.

In one example, there are 20 keywords K1, K2, . . . , K20 that satisfy the requirements of occurring in the specified number of similar applications and that have been voted for by at least 50% of the similar applications. Table 1 shows an example of RPM values for each similar application with respect to the keywords K1, K2, . . . , K20.

TABLE 1

| Keyword | RPM in App1 | RPM in App2 | RPM in App3 | RPM in App4 | RPM in App5 |
|---------|-------------|-------------|-------------|-------------|-------------|
| K1 | R11 | R12 | N/A | R14 | N/A |
| K2 | N/A | R22 | R23 | N/A | R25 |
| K3 | R31 | R32 | R33 | R34 | R35 |
| K4 | R41 | R42 | N/A | R44 | R45 |
| K5 | R51 | R52 | R53 | R54 | R55 |
| . . . | . . . | . . . | . . . | . . . | . . . |
| . . . | . . . | . . . | . . . | . . . | . . . |
| K20 | R20-1 | N/A | R20-3 | R20-4 | R20-5 |

As shown in Table 1, for each of the twenty keywords, the corresponding RPM statistics for each application are provided. For example, for keyword K1 the RPM value for that keyword in App1 is R11. Some of the RPM values are N/A because not all keyword satisfy the requirements in every application. For example, App1 may not have necessary statistical data with respect to keyword K2 to determine the RPM.

For the keywords that do not have enough statistics for particular similar applications, the RPM for those keyword-application pairs can be extrapolated (308). The RPM for a given keyword-application pair can be extrapolated using the RPM of other applications with respect to the same keyword as weighted by the similarity scores for those applications.

Using the keyword-application pair K1-App3 identified as N/A in table 1, the RPM R13 can be extrapolated using the RMP values R11, R12, and R14 for keyword K1 in applications App1, App2, and App4, respectively, and weighted by similarity scores $S_1$, $S_2$, and $S_4$, as follows:

$$\hat{R13} = \frac{S_1 \times R11 + S_2 \times R12 + S_4 R14}{S_1 + S_2 + S_4} = \frac{\sum_{jth\ App\ having\ enough\ statistics} S_j \times R1j}{\sum_{jth\ app\ having\ enough\ statistics} S_j}$$

The similarity score $S_1$ represents the similarity between App0 and App1, $S_2$ represents the similarity score measuring similarity between App0 and App2, and $S_3$ represents the similarity score measuring similarity between App0 and App3. Each other missing RPM value can be extrapolated in a similar manner so that the RPM values are determined for each keyword-application pair. This set of application keywords and corresponding RPMs will be referred to as the initial list.

The system trains a model using the initial list (310). To train the model, the keywords from the initial list that are overlapping with keywords in the application of interest (App0) are selected. In other words, there are sufficient statistics for those selected keywords in App0.

For simplicity, from Table 1 above assume that keywords K1, K2, . . . , K10 are overlapping with App0, resulting in the data shown in Table 2. In this example, keywords K11-K20 lack sufficient statistics in App0.

TABLE 2

| Keyword | RPM in App0 | RPM in App1 | RPM in App2 | RPM in App3 | RPM in App4 | RPM in App5 |
|---|---|---|---|---|---|---|
| K1 | R10 | R11 | R12 | R13 | R14 | R15 |
| K2 | R20 | R21 | R22 | R23 | R24 | R25 |
| K3 | R30 | R31 | R32 | R33 | R34 | R35 |
| K4 | R40 | R41 | R42 | R43 | R44 | R45 |
| K5 | R50 | R51 | R52 | R53 | R54 | R55 |
| . . . | . . . | . . . | . . . | . . . | . . . | . . . |
| . . . | . . . | . . . | . . . | . . . | . . . | . . . |
| K10 | R10-0 | R10-1 | R10-2 | R10-3 | R10-4 | R10-5 |

The RPM of keywords in App0 can be modeled using a weighted least regression as: $RPM_0 = \beta_1 RPM_1 + \beta_2 RPM_2 + \ldots + \beta_5 RPM_5 + \epsilon$ and weighted by similarity scores $S_1, S_2, \ldots S_5$. In particular, the similarity scores are used to solve the $\beta$ values when training the model. This allows the model to be weighted based on the similarity as a weighted regression. $RPM_0$ denotes the RPM of keywords in App0, $RPM_1$ denotes the RPM of keywords in App1, and so on. The similarity scores are used to weight the regression because the more similar the selected applications are to App0, the more confidence there is that its RPM is an explanatory variable, and therefore the more weight it can be given in the regression model. Training the model using the known data allows the coefficients to be determined such that the least regression model can be used to calculate $RPM_0$ for keywords where it is unknown. Thus, using the model and the training data, the weighted regression model can be used to extract new keywords for App0 and predict their corresponding RPM's.

The system extracts new keywords for App0 (312). These are keywords that do not yet exist for App0 but already have enough statistics in the similar applications. In particular, this can include keywords that exist in the initial list, but that do not have enough statistics in App0, e.g., K11, K12, . . . , K20 from Table 1. Assuming that those keywords have RPM values for each of the similar applications, either directly or through the extrapolation described above, the trained model can be applied to calculate a projected $RPM_0$ of a new keyword in App0. The projected $RPM_0$ values could be considered a score used to rank the best candidate keywords to add to App0.

For example, to calculate $RPM_0$ for keyword 11, the same formula is used and relies on the trained values for the $\beta$ coefficients $RPM_0 = \beta_1 RPM_1 + \beta_2 RPM_2 + \ldots + \beta_5 RPM_5 + E$.

The system uses one or more keywords to select advertisements for presentation in App0 (314). The one or more keywords can include one or more extracted keywords depending on the final RPM values for the respective keywords.

In some implementations, keywords can only be extracted from particular application platforms for which the statistical data is available.

Figure 4:
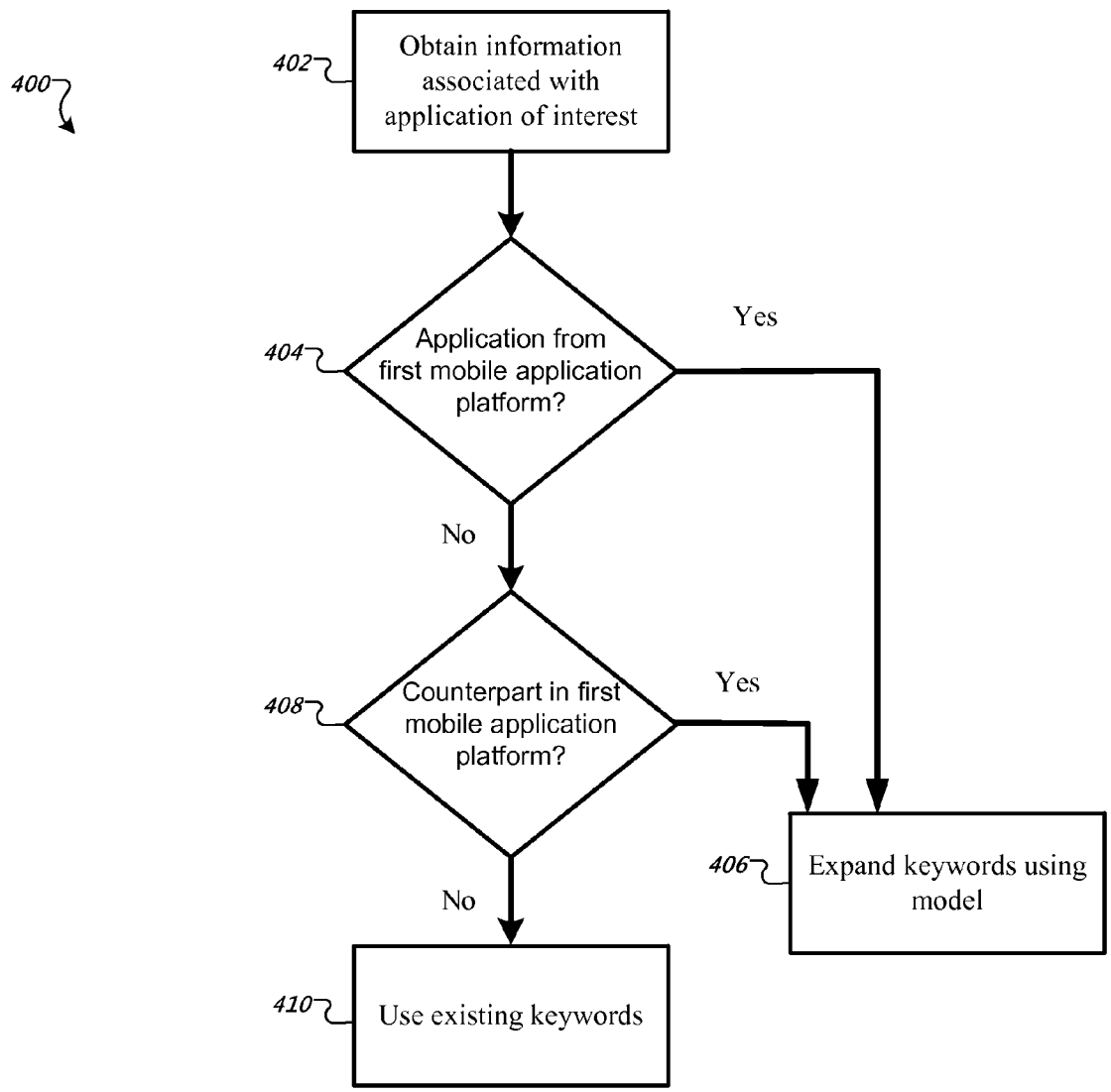
FIG. 4 is a flow diagram of an example process for extracting keywords in applications from different application platforms having a counterpart application in a first application platform.

FIG. 4 is a flow diagram of an example process 400 for extracting keywords in applications from different application platforms having a counterpart application in a first application platform. For convenience, the process 400 will be described with respect to a system that performs the process 400.

The system obtains information associated with an application of interest (402). The application of interest can be, for example, the application App0 described above with respect to FIG. 3. In some implementations, the application information is obtained from a particular mobile application store. For example, the store contents can be crawled to obtain public application information. In some other implementations, applications are submitted by application developers or from advertisers seeking to provide advertising content within the application.

The system determines whether the obtained application of interest is from a first application platform (404). The first application platform can be, for example, an application platform affiliated with the system such that additional information and/or statistics about the application and ad performance on the application, e.g., RPM statistics, are available. In response to the system determining that the application of interest is from the first application platform, keywords can be expanded for the application in a similar manner to that described above with respect to FIG. 3 (406).

In response to the system determining that the application of interest is not from the first application platform, the system determines whether there is a counterpart application to the application of interested from the first application platform (408). Determining a counterpart application in the first application platform is described below with respect to FIGS. 5 and 6. In response to determining that a counterpart application exists in the first application platform, keywords can be expanded for the application in a similar manner to that described above with respect to FIG. 3 (406). In response to the system determining that the there is no counterpart application in the first application platform, the system uses the existing keywords for the application to select advertisements (408), e.g., by comparing keywords for the application with data and/or keywords associated with one or more sponsored content items.

Figure 5:
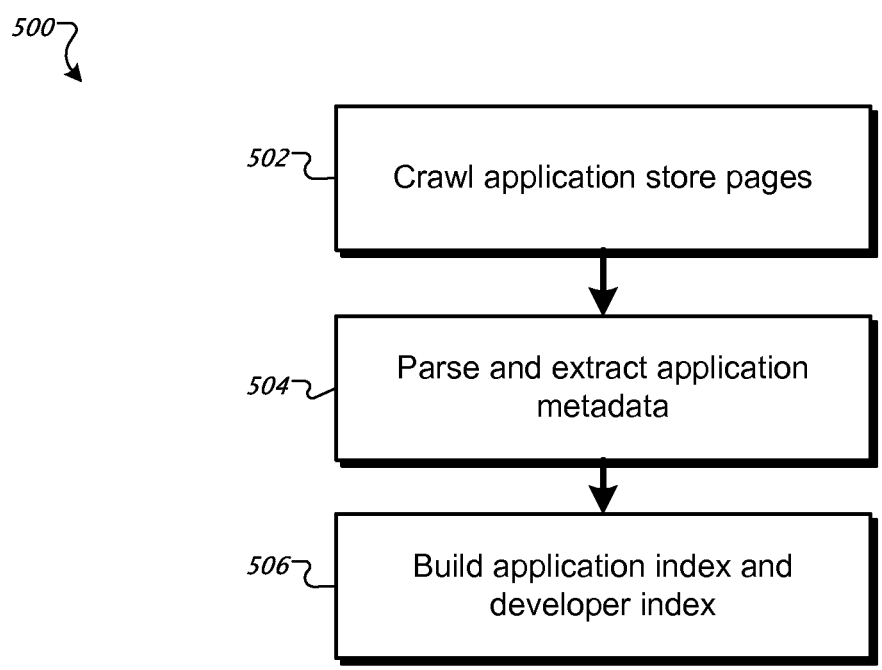
FIG. 5 is a flow diagram of an example process for building indexes.

FIG. 5 is a flow diagram of an example process 500 for building indexes. For convenience, the process 500 will be described with respect to a system that performs the process 500.

The system crawls application store pages for one or more mobile application platforms (502). Each mobile application platform can have a corresponding store from which users can download particular applications for free or in response to a purchase. The store can provide public information about applications available in the store. Information about each application can therefore be crawled from the corresponding application store. For example, each application store can include an indexing page that contains links to different application categories. Under each category, there are links to the respective application pages. Consequently, starting from the indexing page of the store, links to all of the application can be identified and crawled to collect information for each application.

The system parses and extracts application metadata from the crawled information (504). Each application page in a store for a mobile application platform can include comprehensive information about the application, for example, one or more of the application name, developer, description, category, price, rating, or customer reviews. However, various pieces of the information can differ between different mobile application platforms. For example, developers may choose different names for the application on different platforms for strategic reasons. Consequently, identifying a counterpart application on another mobile application platform may not be evident by application name alone.

Therefore, the system extracts all of the related information, or metadata, that can help determine whether two applications are counterparts of each other by parsing the crawled page. For example, an identification of the developer website from the parsed information can be useful for identifying the developer since the same website or at least the same wen domain is likely to be used even if a developer registers with different names on different mobile application platforms.

The system builds an application index and a developer index (506). The indexes are built using the extracted metadata. Each index is built so that given a key, its value can be located and quickly retrieved. The application index is built with the application name as the key and the value for each key as a tuple of the form <description, developer name>. The developer index is built with the developer name as the key and the value for each key as a tuple of the form <developer website, list of apps by the developer>. The indexes can be used to identify a counterpart version in a particular application store, as described below with respect to FIG. 6.

Figure 6:
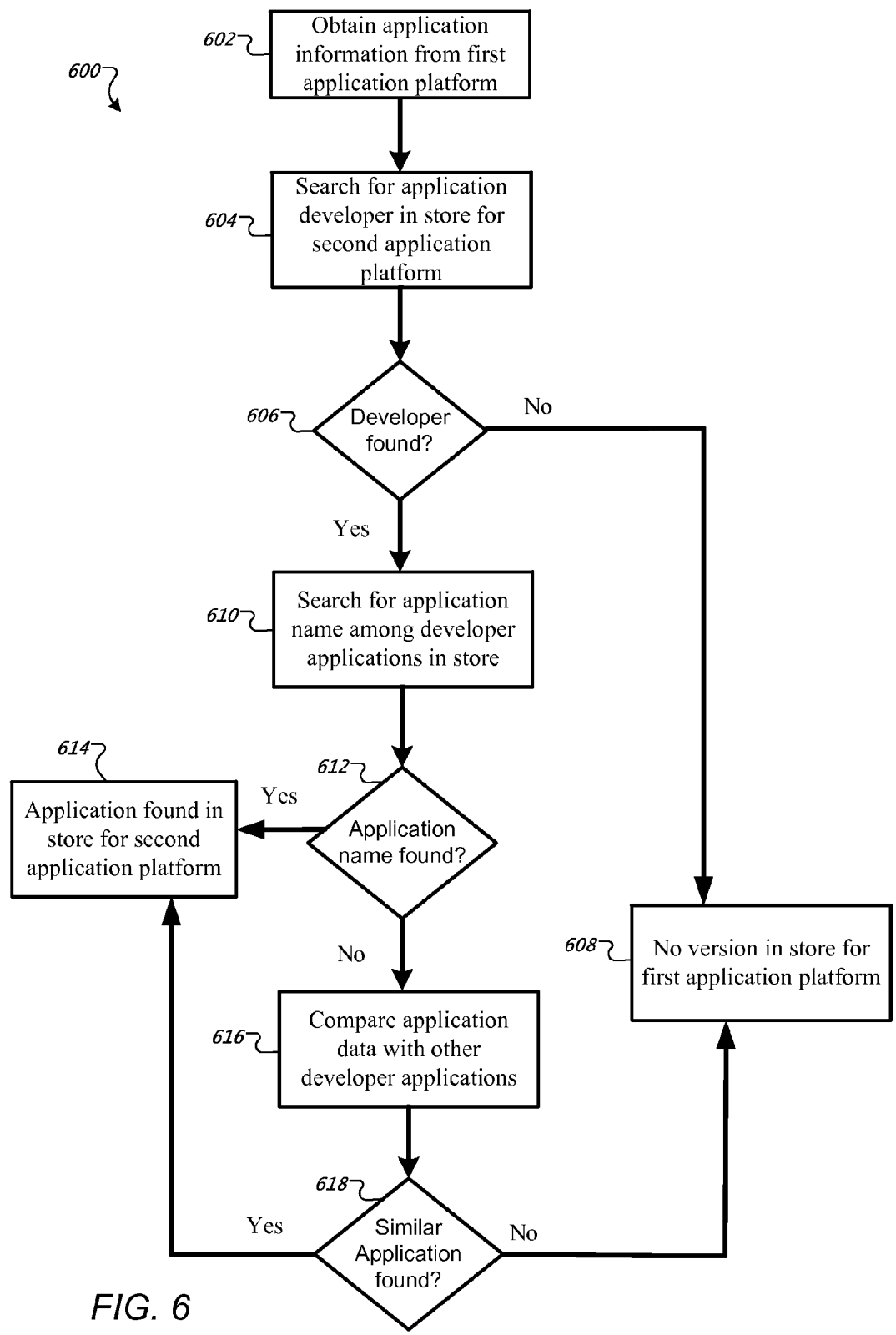
FIG. 6 is a flow diagram of an example process for identifying a version of an application from a first application platform on a second application platform using the indexes of FIG. 5.

FIG. 6 is a flow diagram of an example process 600 for identifying a counterpart version of an application from a first application platform on a second application platform using indexes, e.g., the indexes of FIG. 5. For convenience, the process 600 will be described with respect to a system that performs the process 600.

The system obtains application information (602), for example as describe above, for an application of interest obtained from a first mobile application platform. The system searches the store for a second mobile application platform for an application developer that matches the developer of as the obtained application information (604). The developer can be searched directly by name. If the developer name is not found, a second search can be done by developer website. If the developer website is found, it can be assumed to be the same developer of applications on both platforms.

The system determines whether the developer is found (606). In response to the system determining that the developer is not found, the system determines that there is no counterpart application in the second mobile application platform (608).

In response to the system determining that the developer is found, the system searches for the application name among the applications on the second mobile application platform published by the developer (610).

The system determines whether the application name is found (612). A developer index, e.g., as described above, can be used to search the list of applications by developer for the application name.

In response to determining that the application name is found, the system determines that the counterpart version of the application is found given that they have the same developer and the same application name (614).

In response to determining that the name is not found, the system compares the application information with each application of the second mobile application platform published by the developer (616). The application information can include the name and description information. The description can be obtained from a corresponding application index, e.g., as described above. The similarity between the application information of the obtained application of interest and the other applications of the developer can be determined by comparing, for example, the number of words that are shared in the application name and description between the applications. Other suitable similarity measures can be used. Since it is unlikely that a developer would use a similar name and description for totally different applications, it is likely that similarity beyond a threshold similarity value indicates a counterpart application. A particular threshold similarity value can be determined empirically. For example, a based on testing a particular similarity threshold can be selected such that counterpart applications are identified 95% of the time.

The system determines whether a similar application is found (618). In response to the system determining that a similar application is found, the system determines that the similar application is the counterpart application in the second mobile application store (614). In response to the system determining that a similar application is not found, the system determines that there is no counterpart application in the second mobile application store (608). Once the counterpart application is found, the keywords and statistical information for the application on the second application platform can be used to identify expanded keywords as described with respect to FIG. 3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining information associated with a mobile application of interest;
    determining a plurality of similar applications to the mobile application of interest along with a respective similarity score by querying a database of structured data;
    determining a plurality of keywords from the similar applications having a threshold level of statistical information relating to a performance of a respective keyword with each respective similar application; and
    extracting a new keyword for the mobile application of interest to use for identifying content items for presentation on the mobile application of interest by:
        calculating a projected statistical value for the new keyword using a weighted least regression of the statistical information relating to the performance of the plurality of keywords weighted with the respective similarity score of an associated similar application, and
        determining the projected statistical value for the new keyword exceeds a threshold value.

2. The method of claim 1, wherein the determined plurality of keywords include keywords identified as having statistical information relating to the performance of the keyword for a particular application of the plurality of similar applications based at least on a measure of revenue per thousand impressions.

3. The method of claim 2, wherein statistical information relating to the performance of a particular keyword is extrapolated for a first application based on the known statistical information of one or more other applications and a similarity measure between the first application and the respective application of the one or more other applications.

4. The method of claim 1, wherein calculating the projected statistical value for the new keyword further comprises calculating coefficients for the weighted least regression using the statistical information for each application and the mobile application of interest for each overlapping keyword.

5. The method of claim 1, wherein extracting the new keyword includes calculating projected statistical information for the mobile application of interest for one or more non-overlapping keywords from the plurality of similar applications.

6. The method of claim 1, further comprising: determining application keywords to use for identifying content items for presentation on the application according to a ranking of the statistical information for the application keywords and the new extracted keywords.

7. A method comprising:
    obtaining information associated with a mobile application of interest;
    determining that the mobile application of interest is not from a first mobile application platform;
    determining that a counterpart application to the mobile application of interest exists on a second mobile application platform;
    generating a respective similarity score to the mobile application of interest for each of the counterpart application and a plurality of similar applications to the counterpart application by querying a database of structured data;
    determining a plurality of keywords from the counterpart application and the plurality of similar applications to the counterpart application having a threshold level of statistical information relating to a respective performance of each of the plurality of keywords;
    expanding keywords of the mobile application of interest based on statistical information associated with the counterpart application and a plurality of similar applications to the counterpart application to use for identifying content items for presentation on the mobile application of interest by:
        calculating a projected statistical value for a new keyword using a weighted least regression of the statistical information relating to the performance of the plurality of keywords weighted with the respective similarity score of an associated similar application, and
        determining the projected statistical value for the new keyword exceeds a threshold value.

8. The method of claim 7, wherein determining that a counterpart application to the mobile application of interest exists includes using one or more of an application index and a developer index generated for one or more mobile application platforms.

9. The method of claim 8, comprising:
    crawling pages of an application store;
    extracting application metadata from the crawled information; and generating the application index and the developer index using the metadata.

10. The method of claim 8, wherein determining that a counterpart application to the application of interest exists includes:
  determining whether a counterpart application of the same name as the mobile application of interest is found on the second mobile application platform;
  if the counterpart application of the same name is not found, determining whether the second mobile platform includes a same developer as the developer of the mobile application of interest; and
  if the developer is found; determining whether the application is found among applications of the developer in the second mobile application platform.

11. The method of claim 10, wherein determining whether the second mobile platform includes a same developer includes determining whether applications on the second mobile application platform reference a same web domain.

12. The method of claim 10, wherein determining whether the application is found among applications of the developer includes comparing application information of the mobile application of interest with application information of the developer on the second mobile application platform.

13. A system comprising:
  one or more computers and one or more storage devices storing instructions that are operable, when executed by the one or more computers, to cause the one or more computers to perform operations comprising:
    obtaining information associated with a mobile application of interest;
    determining a plurality of similar applications to the mobile application of interest along with a respective similarity score by querying a database of structured data;
    determining a plurality of keywords from the similar applications having a threshold level of statistical information relating to a performance of a respective keyword with each respective similar application; and
    extracting a new keyword for the mobile application of interest to use for identifying content items for presentation on the mobile application of interest by:
      calculating a projected statistical value for the new keyword using a weighted least regression of the statistical information relating to the performance of the plurality of keywords weighted with the respective similarity score of an associated similar application, and
      determining the projected statistical value for the new keyword exceeds a threshold value.

14. The system of claim 13, wherein the determined plurality of keywords include keywords identified as having statistical information relating to the performance of the keyword for a particular application of the plurality of similar applications based at least on a measure of revenue per thousand impressions.

15. The system of claim 14, wherein statistical information relating to the performance of a particular keyword is extrapolated for a first application based on the known statistical information of one or more other applications and a similarity measure between the first application and the respective application of the one or more other applications.

16. The system of claim 13, wherein calculating the projected statistical value for the new keyword further comprises calculating coefficients for the weighted least regression using the statistical information for each application and the application of interest for each overlapping keyword.

17. The system of claim 13, wherein extracting the new keyword includes calculating projected statistical information for the application of interest for one or more non-overlapping keywords from the plurality of similar applications.

18. The system of claim 13, the operations further comprising: determining application keywords to use for identifying content items for presentation on the application according to a ranking of the statistical information for the application keywords and the new extracted keywords.

19. A system comprising:
  one or more computers and one or more storage devices storing instructions that are operable, when executed by the one or more computers, to cause the one or more computers to perform operations comprising:
    obtaining information associated with a mobile application of interest;
    determining that the mobile application of interest is not from a first mobile application platform;
    determining that a counterpart application to the mobile application of interest exists on a second mobile application platform;
    generating a respective similarity score to the application of interest for each of the counterpart application and a plurality of similar applications to the counterpart application by querying a database of structured data;
    determining a plurality of keywords from the counterpart application and the plurality of similar applications to the counterpart application having a threshold level of statistical information relating to a respective performance of each of the plurality of keywords;
    expanding keywords of the mobile application of interest based on statistical information associated with the counterpart application and a plurality of similar applications to the counterpart application to use for identifying content items for presentation on the mobile application of interest by:
      calculating a projected statistical value for a new keyword using a weighted least regression of the statistical information relating to the performance of the plurality of keywords weighted with the respective similarity score of an associated similar application, and
      determining the projected statistical value for the new keyword exceeds a threshold value.

20. The system of claim 19, wherein determining that a counterpart application to the mobile application of interest exists includes using one or more of an application index and a developer index generated for one or more mobile application platforms.

21. The system of claim 20, wherein the operations comprise:
  crawling pages of an application store;
  extracting application metadata from the crawled information; and
  generating the application index and the developer index using the metadata.

22. The system of claim 20, wherein determining that a counterpart application to the application of interest exists includes:
  determining whether a counterpart application of the same name as the application of interest is found on the second mobile application platform;

if the counterpart application of the same name is not found, determining whether the second mobile platform includes a same developer as the developer of the mobile application of interest; and if the developer is found; determining whether the application is found among applications of the developer in the second mobile application platform.

23. The system of claim 22, wherein determining whether the second mobile platform includes a same developer includes determining whether applications on the second mobile application platform reference a same web domain.

24. The system of claim 22, wherein determining whether the application is found among applications of the developer includes comparing application information of the mobile application of interest with application information of the developer on the second mobile application platform.

25. One or more non-transitory computer-readable storage media encoded with instructions that, when executed by one or more computers, cause the one or more computers to perform operations comprising:

obtaining information associated with a mobile application of interest;

determining a plurality of similar applications to the mobile application of interest along with a respective similarity score by querying a database of structured data;

determining a plurality of keywords from the similar applications having a threshold level of statistical information relating to a performance of a respective keyword with each respective similar application; and extracting a new keyword for the mobile application of interest to use for identifying content items for presentation on the mobile application of interest by:

calculating a projected statistical value for the new keyword using a weighted least regression of the statistical information relating to the performance of the plurality of keywords weighted with the respective similarity score of an associated similar application, and determining the projected statistical value for the new keyword exceeds a threshold value.

26. One or more non-transitory computer-readable storage media encoded with instructions that, when executed by one or more computers, cause the one or more computers to perform operations comprising:

obtaining information associated with a mobile application of interest;

determining that the mobile application of interest is not from a first mobile application platform;

determining that a counterpart application to the mobile application of interest exists on a second mobile application platform;

generating a respective similarity score to the application of interest for each of the counterpart application and a plurality of similar applications to the counterpart application by querying a database of structured data;

determining a plurality of keywords from the counterpart application and the plurality of similar applications to the counterpart application having a threshold level of statistical information relating to a respective performance of each of the plurality of keywords;

expanding keywords of the mobile application of interest based on statistical information associated with the counterpart application and a plurality of similar applications to the counterpart application to use for identifying content items for presentation on the mobile application of interest by:

calculating a projected statistical value for a new keyword using a weighted least regression of the statistical information relating to the performance of the plurality of keywords weighted with the respective similarity score of an associated similar application, and determining the projected statistical value for the new keyword exceeds a threshold value.

* * * * *